United States Patent
Wu (10) Patent No.: US 8,571,542 B2
(45) Date of Patent: Oct. 29, 2013

(54) MOBILE COMMUNICATION DEVICE, SERVICE NETWORK, AND METHODS FOR MDT LOG REPORTING

(75) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 188 days.

(21) Appl. No.: 13/163,222

(22) Filed: Jun. 17, 2011

(65) Prior Publication Data
US 2011/0312306 A1  Dec. 22, 2011

Related U.S. Application Data

(60) Provisional application No. 61/356,700, filed on Jun. 21, 2010.

(51) Int. Cl.
*H04W 24/00* (2009.01)
*H04B 17/00* (2006.01)
*G01R 31/08* (2006.01)

(52) U.S. Cl.
USPC ......... 455/423; 455/424; 455/67.11; 370/241

(58) Field of Classification Search
USPC ..................... 455/436–437, 67.11, 423, 424; 370/331–332, 241
See application file for complete search history.

(56) References Cited

U.S. PATENT DOCUMENTS

| | | | |
|---|---|---|---|
| 2009/0257353 A1* | 10/2009 | Song et al. | 370/241 |
| 2010/0190488 A1* | 7/2010 | Jung et al. | 455/424 |
| 2011/0276838 A1* | 11/2011 | Zhou et al. | 714/45 |

FOREIGN PATENT DOCUMENTS

WO   WO 2011157292 A1 * 12/2011

OTHER PUBLICATIONS

3GPP TSG RAN WG2 #69bis, R2-102292, Procedure for Logged MDT in Idle, Apr. 12-16, 2010.*
3GPP TS 37.320 V0.5.0 (May 2010); 3rd Generation Partnership Project; Technical Specification Group TSG RAN; Universal Terrestrial Radio Access (UTRA) and Evolved; Universal Terrestrial Radio Access (E-UTRA); 14 pages.
3GPP TSG RAN WG2 Meeting #68bis; Valencia, Spain, Jan. 18-22, 2010; CATT; Consideration on Priority of MDT Report; 4.3.1; Discussion and Decision; R2-100074; 2 pages.
3GPP TS 36.331 v9.1.0 (Dec. 2009), "3rd Generation Partnership Project; Technical Specification Group Radio Access Network; Evolved Universal Terrestrial Radio Access (E-UTRA) Radio Resource Control (RRC); Protocol specification, Release 9", 233 pages.

(Continued)

*Primary Examiner* — Wesley Kim
*Assistant Examiner* — Nam Huynh
(74) *Attorney, Agent, or Firm* — Birch, Stewart, Kolasch & Birch LLP (57) ABSTRACT

A mobile communication device and an associated method for MDT log reporting are provided. The method can be used in the mobile communication device which communicates with a service network through a first signaling radio bearer and a second signaling radio bearer. The method first receives a request message on the first signaling radio bearer from the service network, and then determines whether the request message requests for an MDT log. At last, the method transmits a response message containing the MDT log on the second signaling radio bearer to the service network when the request message requests for the MDT log.

11 Claims, 5 Drawing Sheets

(56) References Cited

OTHER PUBLICATIONS

3GPP TS 37.320 v0.5.0 (May 2010), "3rd Generation Partnership Project; Technical Specification Group TSG RAN Universal Terrestrial Radio Access (UTRA) and Evolved Universal Terrestrial RAdio Access (E-UTRA); Radio measurement collection for Minimization of Drive Tests (MDT); Overall description; Stage 2" (Release 10) 13 pages.

3GPP TSG RAN WG2 #70, R2-102783, Samsung, "Configuration handling for logged MDT," Montreal, Canada, May 10-14, 2010, 3 pages.

3GPP TSG RAN WG2 Meeting #68bis, R2-100074, CATT, "Consideration on Priority of MDT Report," Valencia, Spain, Jan. 18-22, 2010, 2 pages.

3GPP, "3rd Generation Partnership Project; Technical Specification Group Radio Access Network; Study on Minimization of drive-tests in Next generation Networks; (Release 9)", 3GPP TR 36.805, V2.0.0, Dec. 2009, 23 pages.

Catt, "Consideration on Priority of MDT Report", 3GPP TSG RAN WG2 Meeting #68bis, R2-100074, Jan. 18-22, 2010, 2 pages.

Catt, "New SRB for MDT Reporting", 3GPP TSG RAN WG2 Meeting #70, R2-102792, May 10-14, 2010, 2 pages.

* cited by examiner

MOBILE COMMUNICATION DEVICE, SERVICE NETWORK, AND METHODS FOR MDT LOG REPORTING

CROSS REFERENCE TO RELATED APPLICATIONS

This application claims priority of U.S. Provisional Application No. 61/356,700, filed on Jun. 21, 2010, and the entirety of which is incorporated by reference herein.

BACKGROUND OF THE INVENTION

1. Field of the Invention

The present invention relates to Minimization of Drive Tests (MDT), and in particular relates to methods and mobile communication devices for reporting an MDT log.

2. Description of the Related Art

In a typical mobile communication environment, a user equipment (UE) may communicate voice and/or data signals with one or more service networks via cellular stations of the service networks. The wireless communications between the UE and the service networks may be in compliance with various wireless technologies, such as the Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

MDT is a collection of measurements and data logging activities performed by a user equipment to replace the manual drive testing that operators have to perform in a telecommunication network. The MDT evaluates network performance per physical location, and is applicable in various telecommunication systems such as the High Speed Packet Access (HSPA) and LTE systems.

In the LTE system, signaling radio bearers (SRB) including SRB0, SRB1, and SRB2 are defined to exchange signaling messages in-between a radio access network and a mobile communication device. Currently the MDT log retrieval is carried on the SRB2 with a UEInformation procedure. However, the UEInformation procedure is carried on the SRB1, i.e. both UEInformationRequest message and UEInformationResponse message are sent on the SRB1. Thus, it is not clearly specified how to select a proper signaling radio bearer to transmit an MDT log by the UEInformation procedure. A method and mobile communication device capable of transmitting the MDT log on a properly-selected signaling radio bearer utilizing the UEInformation procedure is required.

BRIEF SUMMARY OF THE INVENTION

A detailed description is given in the following embodiments with reference to the accompanying drawings.

An embodiment of an MDT log reporting method is disclosed. The method is used in a mobile communication device communicating with a service network through a first signaling radio bearer and a second signaling radio bearer. The method comprises: receiving, by the mobile communication device, a request message on the first signaling radio bearer from the service network; determining, by the mobile communication device, whether the request message requests for the MDT log; and transmitting, by the mobile communication device, a response message containing the MDT log on the second signaling radio bearer to the service network when the request message requests for the MDT log.

Another embodiment of an MDT log reporting method is disclosed. The method is used in a mobile communication device communicating with a service network through a first signaling radio bearer and a second signaling radio bearer. The method comprises: receiving, by the mobile communication device, a request message requesting the MDT log from the service network; determining, by the mobile communication device, whether the request message is received from the second signaling radio bearer; and transmitting, by the mobile communication device, a response message containing the MDT log on the second signaling radio bearer to the service network when the request message is received from the second signaling radio bearer.

An embodiment of an MDT log retrieval method is disclosed. The method is used in a LTE-based network for retrieving the MDT log from a mobile communication device through a Signaling Radio Bearer 1 (SRB 1) and a Signaling Radio Bearer 2 (SRB2). The method comprises: transmitting, by the LTE-based network, a request message to the mobile communication device for the MDT log; and receiving, by the LTE-based network, a response message containing the MDT log corresponding to the request message on the SRB2 from the mobile communication device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. The scope of the invention is best determined by reference to the appended claims. The 3GPP specifications are used to help teach the spirit of the invention, and the invention is not limited thereto.

Figure 1:
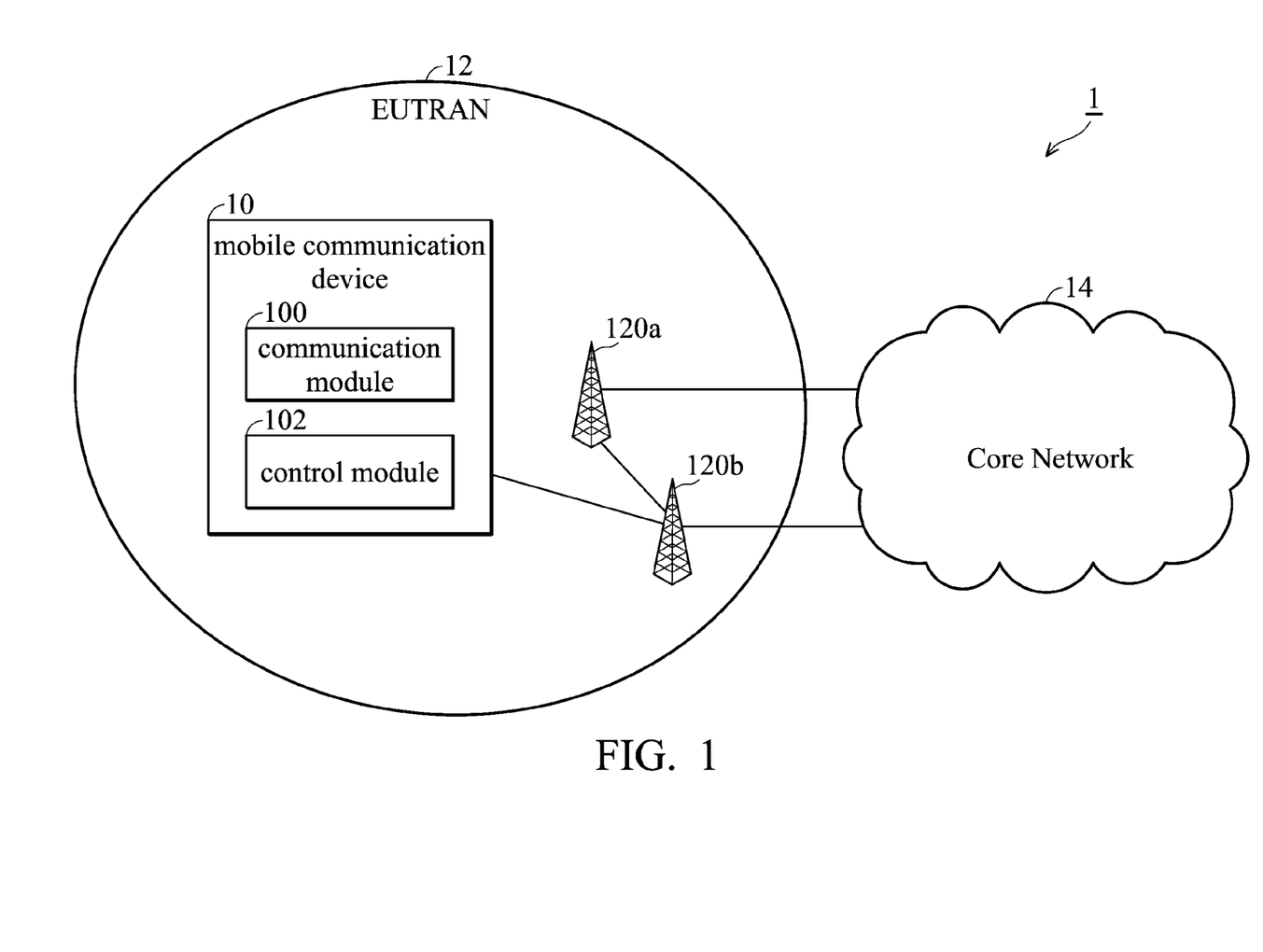
FIG. 1 is a block diagram illustrating a mobile communication environment according to an embodiment of the invention.

FIG. 1 is a block diagram illustrating a mobile communication environment according to an embodiment of the invention. The mobile communication environment 1 is an LTE-based system comprising an Evolved UTRAN (EUTRAN) 12 and a core network 14. The EUTRAN 12 comprises Evolved Node Bs (eNB) 120*a* and 120*b* which communicate to each other through an X2 interface, and are coupled to the core network 14 through an S1 interface. Each eNB is coupled to a plurality of antennas (not shown) responsible for providing a radio coverage covering a specific area or a radio coverage for a specific network operator. The cell directly in connection with the mobile communication device 10 is referred to as a serving cell.

The mobile communication device 10 is any device used for communications, e.g., a handhold mobile phone, a laptop determiner equipped with a broadband network adaptor, or any other device capable of communicating with the eNB 120a or 120b. The mobile communication device 10 comprises a control module 102 and a communication module 100. The control module 102 may comprise hardware to perform baseband signal processing including digital signal processing, coding and decoding, and so on. The communication module 100 may comprise hardware to perform analog to digital conversion (ADC), digital to analog conversion (DAC), gain adjusting, modulation, demodulation, and so on. The communication module 100 may receive RF signals from the eNB 120b and down-convert the received RF signals to baseband signals to be processed by the control module 102, or receive baseband signals from the control module 102 and up-convert the received baseband signals to RF signals for uplink transmission. The radio frequency may be 900 MHz, 2100 MHz, or 2.6 GHz utilized in LTE-based systems, or others depending on the radio access technology (RAT) in use. The control module 102 controls the operation of the communication module 100 and other functional components, such as a display unit and/or keypad serving as an MMI (man-machine interface), a storage unit storing the program codes of applications or technologies, or others. The mobile communication device 10 is a UE in compliance with the 3GPP TS 36.331 specification and other related specifications of the LTE technology, and the invention is not limited thereto.

The MDT comprises two types, namely, an Immediate MDT and a Logged MDT. The Immediate MDT is a functionality involving measurements performed by a mobile communication device in a CONNECTED state and reporting of the measurements to an eNB/RNC available at the time of the reporting condition. The Logged MDT is a functionality involving measurements performed by a mobile communication device in an IDLE state at points in time when configured conditions are satisfied, wherein the collected measurements (also called MDT measurements hereafter) are stored in a measurement log (also called MDT log hereafter) for reporting to an eNB/RNC at a later point in time. The MDT log may contain one MDT measurement or a plurality of MDT measurements.

In the EUTRAN 12, the mobile communication device 10 is configured with a Logged MDT configuration in CONNECTED state to perform Logged MDT measurements in an IDLE state. The mobile communication device 10 collects MDT measurements which are measured results for the serving cell and neighbor cells and keeps the MDT measurements in its memory component. When an RRC connection is established between the mobile communication device 10 and the EUTRAN 12, and the mobile communication device 10 may inform the EUTRAN 12 of availability of the MDT log, which may later be retrieved by the EUTRAN 12. The RRC connection offers three Signaling Radio Bearers (SRBs) for the control plane signaling message transfer, namely, SRB0, SRB1, and SRB2. The SRB0 is used for Common Control Channel (CCCH) messages whereas SRB1 and SRB2 are utilized for Dedicated Control Channel (DCCH) messages. The SRB1 has a higher priority than the SRB2, which is set up only after security has been activated.

Figure 2:
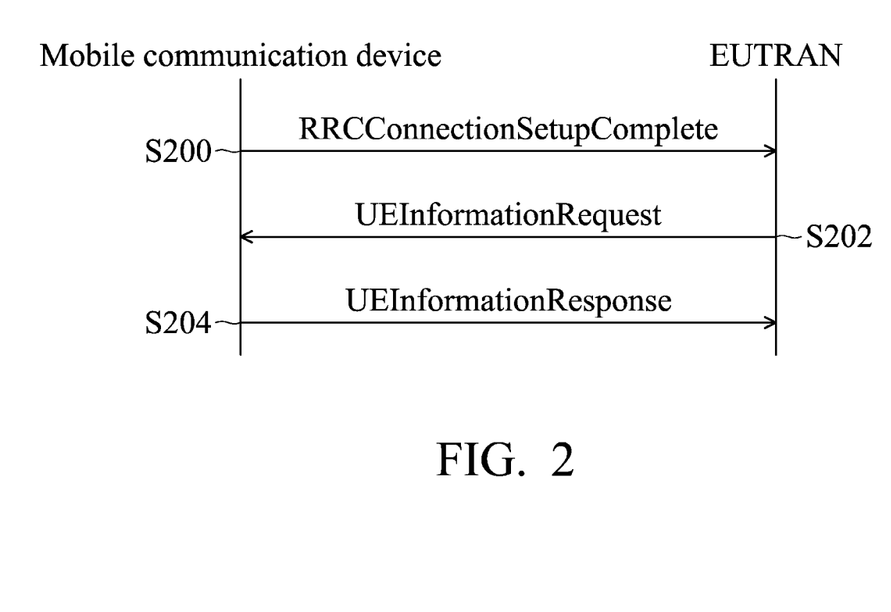
FIG. 2 is a message sequence chart for conventional MDT log reporting.

The mobile communication devices 10 indicates the availability of MDT log by means of a one bit indicator in an RRCConnectionSetupComplete message (S200) during RRC connection establishment, as shown in FIG. 2, which is a message sequence chart for conventional MDT log reporting. In all cases, the mobile communication device 10 includes the indication even though the logging period may not have ended. The EUTRAN 12 can decide to retrieve the MDT log based on the indication. In the case where the MDT log is retrieved before the completion of the pre-defined logging duration, the MDT log can be deleted, but the Logged MDT measurement logging continues according to the Logged MDT configuration. The MDT log reporting is triggered by the on-demand mechanism, i.e. the mobile communication device 10 is requested by the EUTRAN 12 to send the MDT log thereto via RRC signaling e.g., UEInformationRequest message (S202). In response to the MDT log request in the UEInformationRequest message, the mobile communication device 10 returns the MDT log in the UEInformationResponse message to the serving cell (S204). The reporting may occur in different cells other than cell for which the Logged MDT configuration is signaled. The MDT log comprises measurement results for the serving cell (the measurement quantity) and available UE measurements performed in idle for intra-frequency/inter-frequency/inter-RAT, time stamps and location information. The location information is based on the available location information in the mobile communication device 10. Thus, the Logged MDT measurements are tagged by the mobile communication device 10 with location data that includes an ECGI of the serving cell when the measurement was taken, GNSS location information if available in the mobile communication device 10 when the measurement was taken, and RF fingerprint information consisting of a PCI/PSC and RSRP/CPICH RSCP for up to 6 intra-frequency neighbor cells if the GNSS location information was not available when the measurement was taken.

Figure 3:
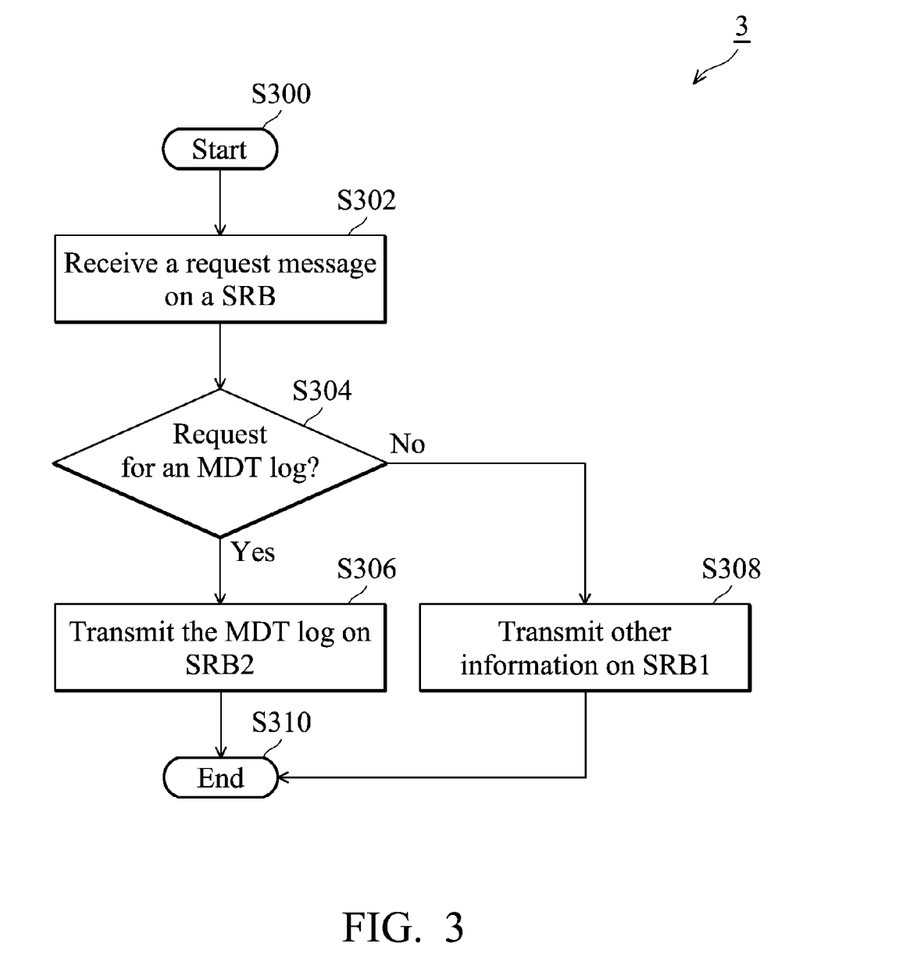
FIG. 3 is a flow chart of an MDT log reporting method used in a mobile communication device according to an embodiment of the invention.

FIG. 3 is a flowchart of an MDT log reporting method 3 used in a mobile communication device according to an embodiment of the invention. The mobile communication device receives a UEInformationRequest message which may contain MDT log request and other information request requesting for the available MDT log and other information (e.g. a RACH report, or a RLF report) (S302). The UEInformationRequest message requests for the MDT log when an MDT log request parameter is set to TRUE, requests for the RACH report when a rach-ReportReq parameter is set to TRUE, and requests for the RLF report when a rlf-ReportReq parameter is set to TRUE. The mobile communication device then determines whether the UEInformationRequest message requests for the MDT log (S304). If so, the mobile communication device transmits a UEInformationResponse message containing the MDT log on SRB2 (S306). If the UEInformationRequest message further requests the other information, the UEInformationResponse message contains the other information. Otherwise the mobile communication device transmits the other requested information other than the MDT log on SRB1 (S308). Upon completion of the UEInformationResponse message transmission, the MDT log reporting method 3 is completed and exited (S310).

Figure 4:
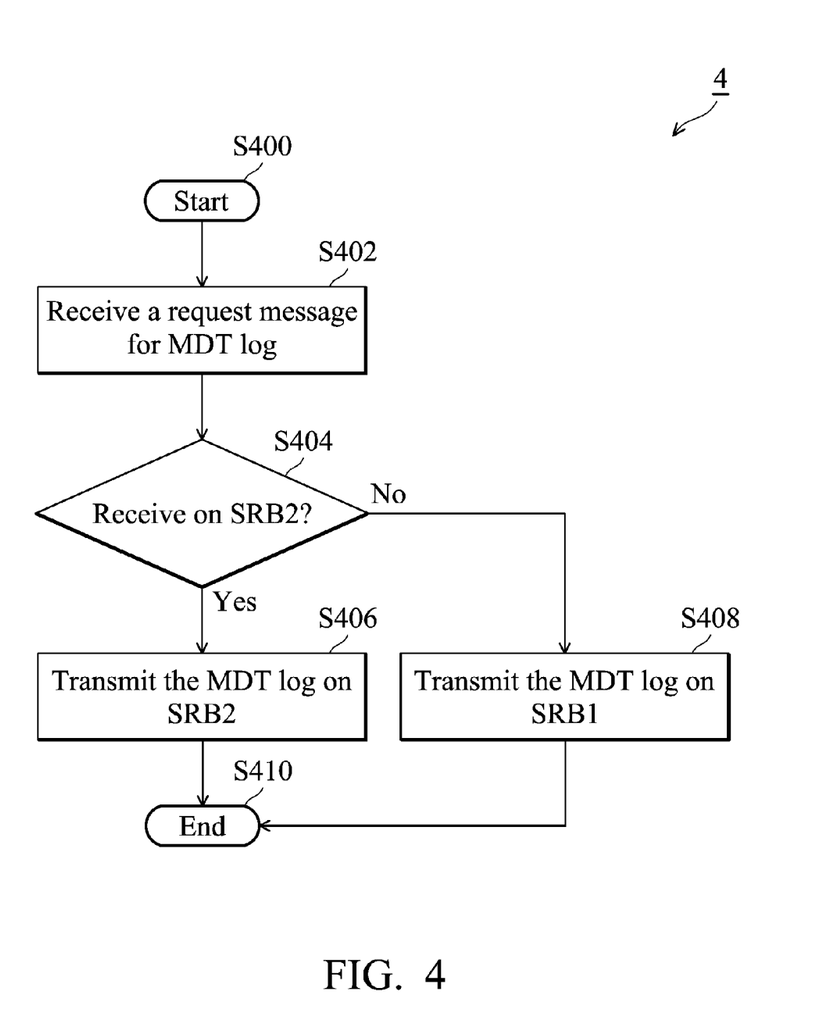
FIG. 4 is a flowchart of an MDT log reporting method used in a mobile communication device according to an embodiment of the invention.

FIG. 4 is a flowchart of an MDT log reporting method 4 used in a mobile communication device according to an embodiment of the invention. The mobile communication device receives a UEInformationRequest message containing a MDT log request (S402). The mobile communication device then determines whether the UEInformationRequest message is received on SRB2 (S404). If so, the mobile communication device transmits a UEInformationResponse message containing the MDT log on the SRB2 (S406). Otherwise the mobile communication device transmits the MDT log on the SRB1 (S408). Upon completion of the UEInformationResponse message transmission, the MDT log reporting method 4 is completed and exited (S410).

Figure 5:
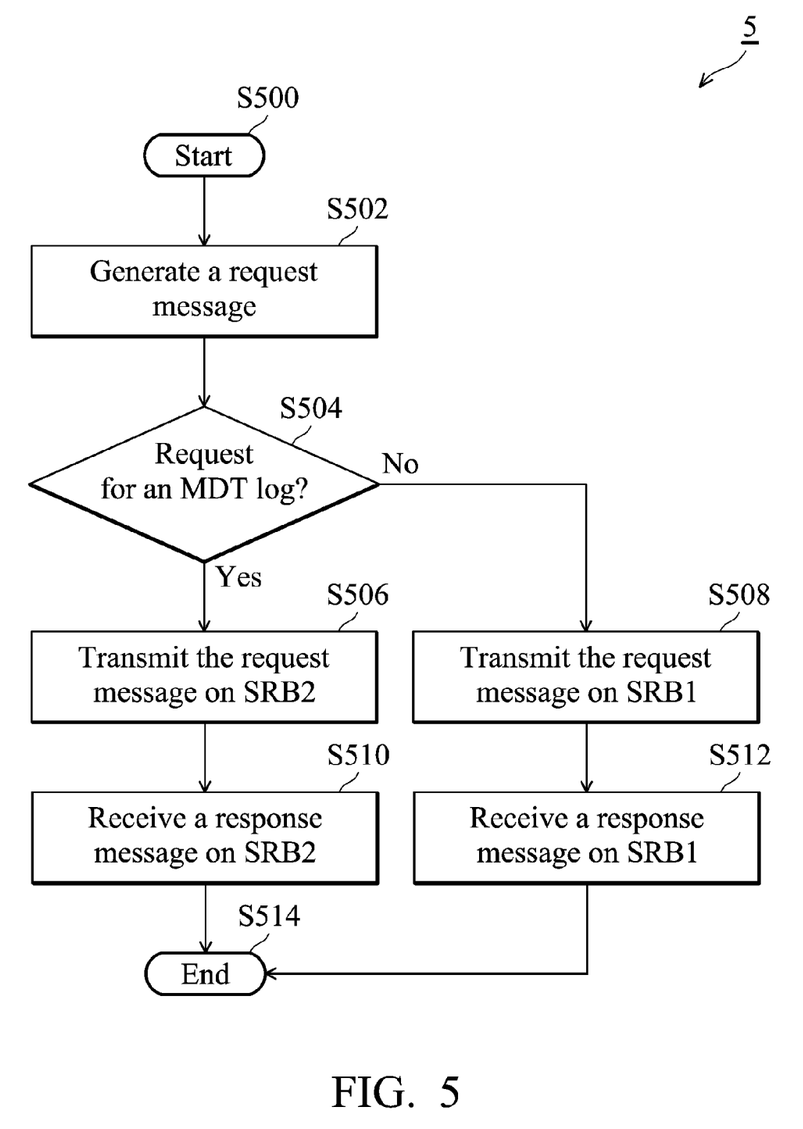
FIG. 5 is a flowchart of a data retrieving method used in a LTE-based network according to an embodiment of the invention.

FIG. 5 is a flowchart of a data retrieving method 5 used in a service network according to an embodiment of the invention. The service network can be a LTE-based network. The LTE-based network (e.g. EUTRAN) generates a UEInformationRequest message to be transmitted (S502). Then, the LTE-based network determines whether the UEInformationRequest message requests for an MDT log at a mobile communication device (S504). If so, the LTE-based network transmits the UEInformationRequest message on SRB2 to request for the MDT log (S506). The UEInformationRequest message may request for other information (e.g. a RACH report or a RLF report) at the mobile communication device. Preferably, the UEInformationRequest message requests for the MDT log when an MDT report request parameter therein is set to TRUE, requests for the RACH report when a rach-ReportReq parameter therein is set to TRUE, and requests for the RLF report when a rlf-ReportReq parameter therein is set to TRUE. Then, the LTE-based network receives a UEInformationResponse message containing the MDT log (and the other information) from the mobile communication device on SRB2 (S510). On the other hand, if the UEInformationRequest message does not request for an MDT log, the LTE-based network transmits the UEInformationRequest message on SRB1 (S508). Then, the LTE-based network receives a UEInformationResponse message from the mobile communication device on SRB1 (S512). Upon completion of the UEInformationResponse message reception, the MDT log reporting method 5 is completed and exited (S514).

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reporting Minimization of Drive Tests (MDT) log by a mobile communication device communicating with a service network through a first signaling radio bearer and a second signaling radio bearer, the method comprising:

receiving, by the mobile communication device, a request message on the first signaling radio bearer from the service network;

determining, by the mobile communication device, whether the request message requests for the MDT log;

transmitting, by the mobile communication device, a response message containing the MDT log on the second signaling radio bearer to the service network when the request message requests for the MDT log, wherein the response message transmitted by the mobile communication device further contains other information when the request message further requests for the other information in addition to the MDT log, and transmitting, by the mobile communication device, the response message which does not contain the MDT log on the first signaling radio bearer to the service network when the request message does not request for the MDT log.

2. The method of claim 1, wherein the other information comprises at least one of a Random Access Channel (RACH) report and a Radio Link Failure (RLF) report.

3. The method of claim 1, wherein the service network is a LTE-based network.

4. The method of claim 3, wherein the first signaling radio bearer is SRB1 and the second signaling radio bearer is SRB2.

5. A method of receiving Minimization of Drive Tests (MDT) log from a mobile communication device communicating by a service network through a first signaling radio bearer and a second signaling radio bearer, the method comprising:

transmitting to the mobile communication device, a request message on the first signaling radio bearer from the service network;

following a determination by the mobile communication device on whether the request message requests for the MDT log, receiving from the mobile communication device, a response message containing the MDT log on the second signaling radio bearer to the service network when the request message requests for the MDT log, wherein the response message transmitted by the mobile communication device further contains other information when the request message further requests for the other information in addition to the MDT log; and receiving from the mobile communication device the response message which does not contain the MDT log on the first signaling radio bearer to the service network when the request message does not request for the MDT log.

6. The method of claim 5, wherein the request message is transmitted on the SRB2.

7. The method of claim 5, wherein the request message is transmitted on the SRB1.

8. The method of claim 5, wherein the other information comprises at least one of a Random Access Channel (RACH) report and a Radio Link Failure (RLF) report.

9. The method of claim 5, wherein the service network is a LTE-based network.

10. A mobile communication device operable to communicate with a service network through a first signaling radio bearer and a second signaling radio bearer, the mobile communication device arranged to:

receive a request message on the first signaling radio bearer from the service network; determine whether the request message requests for a Minimization of Drive Tests (MDT) log;

transmit a response message containing the MDT log on the second signaling radio bearer to the service network when the request message requests for the MDT log, wherein the response message further contains other information when the request message further requests for the other information in addition to the MDT log, and transmit the response message which does not contain the MDT log on the first signaling radio bearer to the service network when the request message does not request for the MDT log.

11. A service network operable to communicate with a mobile communication device through a first signaling radio bearer and a second signaling radio bearer, the service network arranged to:
  transmit to the mobile communication device a request message on the first signaling radio bearer; and
  following a determination by the mobile communication device on whether the request message requests for Minimization of Drive Tests (MDT) log, receive from the mobile communication device a response message containing the MDT log on the second signaling radio bearer when the request message requests for the MDT log, wherein the response message received from the mobile communication device further contains other information when the request message further requests for the other information in addition to the MDT log, and
  receiving from the mobile communication device the response message which does not contain the MDT log on the first signaling radio bearer to the service network when the request message does not request for the MDT log.

* * * * *